US009152625B2

(12) United States Patent
Louis et al.

(10) Patent No.: US 9,152,625 B2
(45) Date of Patent: Oct. 6, 2015

(54) MICROBLOG SUMMARIZATION

(75) Inventors: Annie P. Louis, Philadelphia, PA (US); Todd D. Newman, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 593 days.

(21) Appl. No.: 13/295,661

(22) Filed: Nov. 14, 2011

(65) Prior Publication Data

US 2013/0124191 A1 May 16, 2013

(51) Int. Cl.
*G06F 17/27* (2006.01)
*G10L 15/00* (2013.01)
*G10L 15/18* (2013.01)
*G06F 17/30* (2006.01)

(52) U.S. Cl.
CPC ...................................... *G06F 17/30* (2013.01)

(58) Field of Classification Search
USPC .................................................... 704/1, 9, 10
See application file for complete search history.

(56) References Cited

U.S. PATENT DOCUMENTS

| 7,600,017 | B2 * | 10/2009 | Holtzman et al. ............ 709/224 |
| 7,987,188 | B2 * | 7/2011 | Neylon et al. ................. 707/739 |
| 8,423,551 | B1 * | 4/2013 | Ben-Artzi et al. ............ 707/737 |
| 2006/0026152 | A1 * | 2/2006 | Zeng et al. ........................ 707/5 |
| 2007/0016580 | A1 * | 1/2007 | Mann et al. ........................ 707/6 |
| 2007/0282867 | A1 * | 12/2007 | McAllister et al. ........... 707/100 |
| 2007/0294230 | A1 | 12/2007 | Sinel et al. |
| 2008/0133488 | A1 * | 6/2008 | Bandaru et al. .................... 707/3 |
| 2008/0215571 | A1 * | 9/2008 | Huang et al. ....................... 707/5 |
| 2008/0270116 | A1 * | 10/2008 | Godbole et al. ................... 704/9 |
| 2009/0112892 | A1 * | 4/2009 | Cardie et al. ................... 707/100 |
| 2009/0216524 | A1 * | 8/2009 | Skubacz et al. ................... 704/9 |
| 2009/0265307 | A1 | 10/2009 | Reisman et al. |
| 2010/0050118 | A1 * | 2/2010 | Chowdhury et al. ......... 715/810 |
| 2010/0145940 | A1 * | 6/2010 | Chen et al. ..................... 707/736 |
| 2010/0169317 | A1 | 7/2010 | Wang et al. |
| 2010/0312769 | A1 * | 12/2010 | Bailey et al. .................. 707/740 |
| 2010/0332287 | A1 * | 12/2010 | Gates et al. ...................... 705/10 |
| 2011/0137906 | A1 * | 6/2011 | Cai et al. ....................... 707/740 |

(Continued)

FOREIGN PATENT DOCUMENTS

| CN | 101685453 | 3/2010 |
| CN | 102184232 | 9/2011 |

(Continued)

OTHER PUBLICATIONS

Shi et al, "Web Forum Sentiment Analysis Based on Topics," Computer and Information Technology, Oct. 2009. CIT '09. Ninth IEEE International Conference on , vol. 2, No., pp. 148,153, Oct. 11-14, 2009.*

(Continued)

*Primary Examiner* — Olujimi Adesanya
(74) *Attorney, Agent, or Firm* — Judy Yee; Micky Minhas; Wolfe-SBMC

(57) ABSTRACT

Various embodiments provide summarization techniques that can be applied to blogs or microblogs to present information that is determined to be useful, in a shortened form. In one or more embodiments, a procedure is utilized to automatically acquire a set of concepts from various sources, such as free text. These acquired concepts are then used to guide a clustering process. Clusters are ranked and then summarized by incorporating sentiment and the frequency of words.

20 Claims, 7 Drawing Sheets

(56) References Cited

U.S. PATENT DOCUMENTS

| | | | |
|---|---|---|---|
| 2011/0295903 A1* | 12/2011 | Chen | 707/794 |
| 2012/0102037 A1* | 4/2012 | Ozonat | 707/738 |
| 2012/0131021 A1* | 5/2012 | Blair-Goldensohn et al. | 707/750 |
| 2012/0143597 A1* | 6/2012 | Mushtaq et al. | 704/9 |

FOREIGN PATENT DOCUMENTS

| | | |
|---|---|---|
| JP | 2006244305 A | 9/2006 |
| KR | 20070035659 A | 4/2007 |
| KR | 20090016043 A | 2/2009 |

OTHER PUBLICATIONS

Xu et al, "Opinion Mining", Dec. 2007, DFKI, Saarbruecken, Germany, pp. 1-84.*

Lin et al, "Assessing Text Readability Using Hierarchical Lexical Relations Retrieved from WordNet", Mar. 2009, In Computational Linguistics and Chinese Language Processing, vol. 14, No. 1, pp. 45-84.*

Dave et al, "Mining the Peanut Gallery: Opinion Extraction and Semantic Classification of Product Reviews", 2003, In WWW'03, pp. 1-10.*

De Choudhury et al "Identifying relevant social media content: Leveraging information diversity and user cognition", Jun. 2011, In HT '11, pp. 161-170.*

De Choudhury et al "Find me the right content! diversity-based sampling of social media spaces for topic-centric search", Jul. 2011, In Proc. ICWSM, pp. 1-8.*

Kim, Soo-Min and Eduard Hovy. Automatic identification of pro and con reasons in online reviews, 2006, in Proceedings of COLING/ACL 2006 Main Conference Poster Sessions (ACL-2006). 2006, pp. 1-8.*

Rosa, et al., "Topical Clustering of Tweets", Retrieved at <<http://www.cs.cmu.edu/~kdelaros/sigir-swsm-2011.pdf>>, 3rd Workshop on Social Web Search and Mining, Jul. 28, 2011, pp. 8.

Blair-Goldensohn, et al., "Building a Sentiment Summarizer for Local Service Reviews", Retrieved at <<http:// www.cl.cs.titech.ac.jp/~fujii/NLPIX2008/paper3.pdf>>, in NLP in the Information Explosion Era, Apr. 21-25, 2008, pp. 10.

Sharifi, et al., "Summarizing Microblogs Automatically", Retrieved at <<http://aclweb.org/anthology/N/N10/N10-1100.pdf>>, Human Language Technologies: The 2010 Annual Conference of the North American Chapter of the Association for Computational Linguistics, Jun. 2010, pp. 685-688.

Lerman, et al., "Sentiment Summarization: Evaluating and Learning User Preferences", Retrieved at <<http://www1.cs.columbia.edu/~klerman/sentiment-summarization-09.pdf>>, 12th Conference of the European Chapter of the Association for Computational Linguistics, Apr. 3, 2009, pp. 514-522.

Chakrabarti, et al., "Event Summarization using Tweets", Retrieved at <<http://www.cs.cmu.edu/~deepay/mywww/papers/icwsm11-twitterevents.pdf>>, 5th International Conference on Weblogs and Social Media, ICWSM (2011), pp. 8.

Hu, et al., "Mining Opinion Features in Customer Reviews", Retrieved at <<http://www.cs.uic.edu/~liub/publications/aaai04-featureExtract.pdf>>, Proceedings of the 19th national conference on Artifical intelligence, 2004, pp. 6.

Sauper, et al., "Content Models with Attitude", Retrieved at <<http://aclweb.org/anthology-new/P/P11/P11-1036.pdf>>, Proceedings of the 49th Annual Meeting of the Association for Computational Linguistics, Jun. 19-24, 2011, pp. 350-358.

Zhai, et al., "Clustering Product Features for Opinion Mining", Retrieved at <<http://www.cs.uic.edu/~liub/publications/wsdm-2011-final.pdf>>, Proceedings of WSDM, Feb. 9-12, 2011, pp. 8.

Gamon, et al., "Pulse: Mining Customer Opinions from Free Text", Retrieved at <<http://dmlab.uos.ac.kr/html/lecture/Textmining(2007-2)/Pulse-%20Mining%20Customer%20Opinions%20from%20Free%20Text-2005.pdf>>, Proceedings of IDA, 2005, pp. 12.

Zhuang, et al., "Movie Review Mining and Summarization", Retrieved at <<http://research.microsoft.com/en-us/um/people/leizhang/paper/cikm06_movie.pdf>>, Proceedings of CIKM, 2006, pp. 8.

"International Search Report", Mailed Date: Feb. 28, 2013, Application No. PCT/US2012/064899, Filed Date: Nov. 14, 2012, pp. 10. (MS# 334592.02).

"Foreign Office Action", CN Application No. 201210453572.6, Feb. 4, 2015, 17 pages.

* cited by examiner

MICROBLOG SUMMARIZATION

BACKGROUND

A great deal of public opinion is expressed via the World Wide Web. Often times, these opinions are expressed in so-called blogs or microblogs. A blog (short for "web log"), is typically used to provide commentary, descriptions of events, or other material such as graphics or videos. Microblogging is a broadcast medium in the form of blogging and differs from a traditional blog in that its content is typically smaller in both actual and aggregate file size.

Blogs or microblogs can typically contain a great deal of information. This information can be of interest to many different individuals. Yet, because of the vast number of blogs or microblogs, this information can often be obscured or lost altogether.

SUMMARY

This Summary is provided to introduce a selection of concepts in a simplified form that are further described below in the Detailed Description. This Summary is not intended to identify key features or essential features of the claimed subject matter.

Various embodiments provide summarization techniques that can be applied to blogs or microblogs to present information that is determined to be useful, in a shortened form. In one or more embodiments, a procedure is utilized to automatically acquire a set of concepts from various sources, such as free text. These acquired concepts are then used to guide a clustering process. Clusters are ranked and then summarized by incorporating sentiment and the frequency of words.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Various embodiments provide summarization techniques that can be applied to blogs or microblogs to present information that is determined to be useful, in a shortened form. The techniques can be applied to blogs or blog-type entries of any size. In at least some embodiments, the techniques can be applied to entries which typically have 1000 characters or less. In at least some embodiments, the techniques can be applied to microblogs having 140 characters or less. This includes microblogs which may be only a few sentences long. One example of such microblogs are so called "tweets". The summarization techniques can be applied across a wide variety of entry types.

In one or more embodiments, a procedure is utilized to automatically acquire a set of concepts from various sources, such as free text. These acquired concepts are then used to guide a clustering process. Clusters are ranked and then summarized by incorporating sentiment and the frequency of words.

To illustrate the summarization techniques, entry types in the form of company-related microblogs are utilized. These microblogs typically mention a company name and may contain an expression of an opinion relative to a mentioned company. Often times, these microblogs are not intentional reviews and can contain diverse views ranging from discussions around news articles to job postings and advertisements related to a particular company. This makes it more difficult to automatically determine the sentiment expressed in the microblog. In this context, procedures are utilized to acquire a set of business concepts which are then used to guide the clustering process in which the clusters are ranked and summarized.

In the following discussion, an example environment is first described that is operable to employ the techniques described herein. Example illustrations of the various embodiments are then described, which may be employed in the example environment, as well as in other environments. Accordingly, the example environment is not limited to performing the described embodiments and the described embodiments are not limited to implementation in the example environment.

Example Operating Environment

Figure 1:
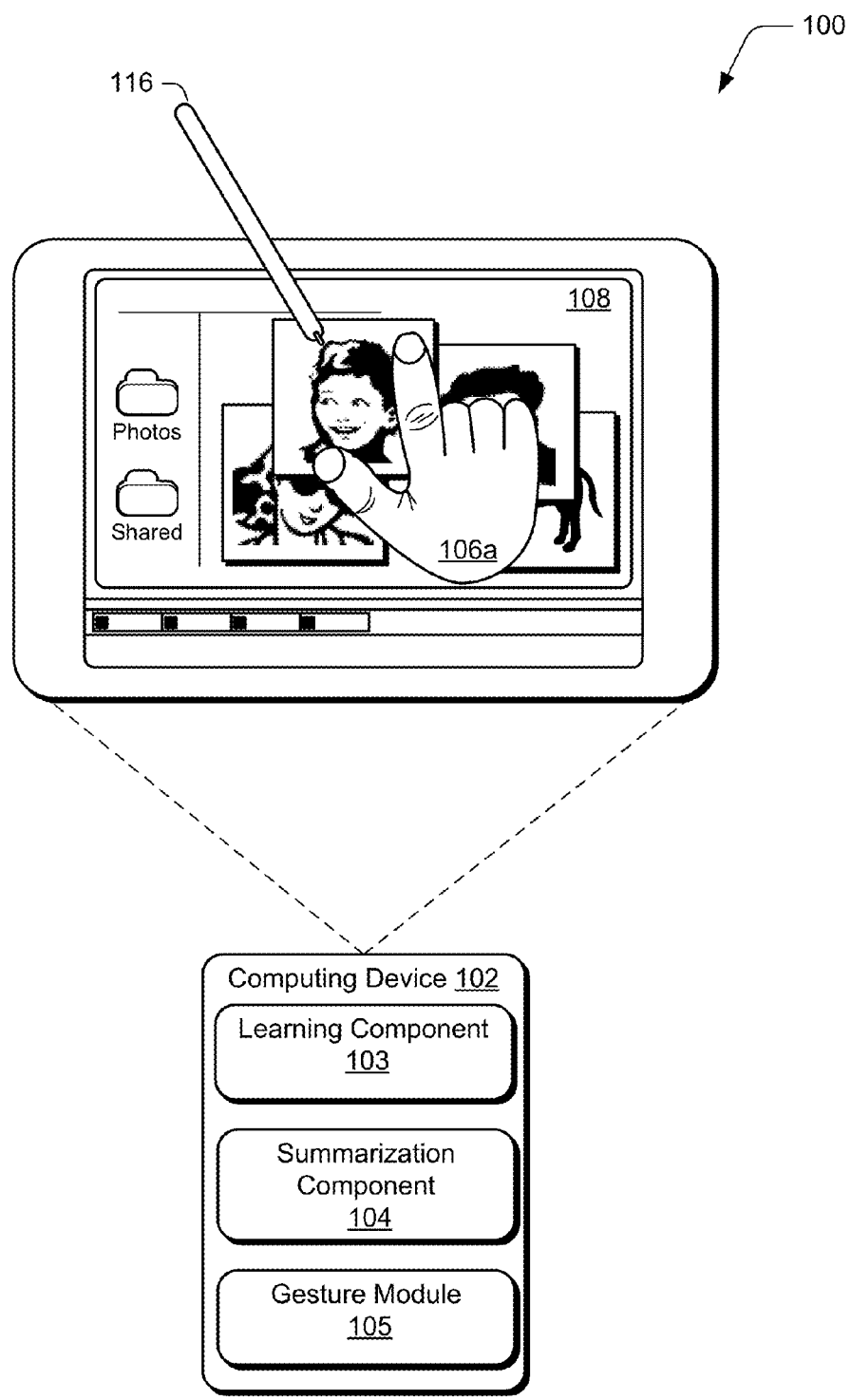
FIG. 1 is an illustration of an environment in an example implementation in accordance with one or more embodiments.

FIG. 1 is an illustration of an environment 100 in an example implementation that is operable to employ the techniques described in this document. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 2. Thus, the computing device 102 may range from full resource devices with substantial memory and processor resources (e.g., personal computers, game consoles) to a low-resource device with limited memory and/or processing resources (e.g., traditional set-top boxes, handheld game consoles). The computing device 102 also includes software that causes the computing device 102 to perform one or more operations as described below.

Computing device 102 includes a learning component 103 and a summarization component 104.

Learning component 103 is representative of functionality that, in one or more embodiments, enables automatic learning of concepts, such as business concepts. It is to be appreciated and understood that the techniques described herein can be implemented in other domains including, by way of example and not limitation, sports teams, entertainment, scientific research, politicians, public affairs issues, and/or student life, to name just a few. In the business context, learning component 103 enables prior learning of business concepts that are generic and related to many if not most or all companies. These concepts are then used as possible clusters. Microblogs then get mapped to these concepts. For example, concepts associated with a company may include "people", "products", "assets", and "events". Each of these concepts can be utilized to cluster microblogs. In the approach described below, all of the companies will have the same set of possible clusters, but will vary on which concepts have more volume in the microblogs of a particular day. The automatic learning process can be performed in an off-line procedure that utilizes various resources such as, by way of example and not limitation, news articles and the like. Using this approach, concepts associated with companies can be applicable to all types of companies regardless of whether the company is a technology-related company or a retail business, as will become apparent below.

Summarization component 104 is representative of functionality that enables clusters to be ranked by sentiment and entropy. This enables clusters that discuss a common issue to be ranked higher than a cluster that encompasses diverse content. For example, on a given day when a company CEO resigns, many users may discuss this event and, accordingly, the "people" cluster of the company would have homogeneous content on that particular day. This homogeneity would be in contrast to the product cluster of the company where, for example, people might be talking about different products. In addition, the sentiment value of the cluster is also taken into consideration. Entropy measurement provides a way to determine homogeneity. In the illustrated and described embodiment, sentiment is incorporated with word frequency to compute an entropy measure, which is then used for ranking clusters, as will become apparent below. Once the clusters have been ranked, the summarization component 104 can summarize the clusters.

Computing device 102 also includes a gesture module 105 that recognizes gestures that can be performed by one or more fingers, and causes operations to be performed that correspond to the gestures. The gestures may be recognized by module 105 in a variety of different ways. For example, the gesture module 105 may be configured to recognize a touch input, such as a finger of a user's hand 106a as proximal to display device 108 of the computing device 102 using touchscreen functionality. Module 105 can be utilized to recognize single-finger gestures and bezel gestures, multiple-finger/same-hand gestures and bezel gestures, and/or multiple-finger/different-hand gestures and bezel gestures.

The computing device 102 may also be configured to detect and differentiate between a touch input (e.g., provided by one or more fingers of the user's hand 106a) and a stylus input (e.g., provided by a stylus 116). The differentiation may be performed in a variety of ways, such as by detecting an amount of the display device 108 that is contacted by the finger of the user's hand 106a versus an amount of the display device 108 that is contacted by the stylus 116.

Thus, the gesture module 105 may support a variety of different gesture techniques through recognition and leverage of a division between stylus and touch inputs, as well as different types of touch inputs.

Figure 2:
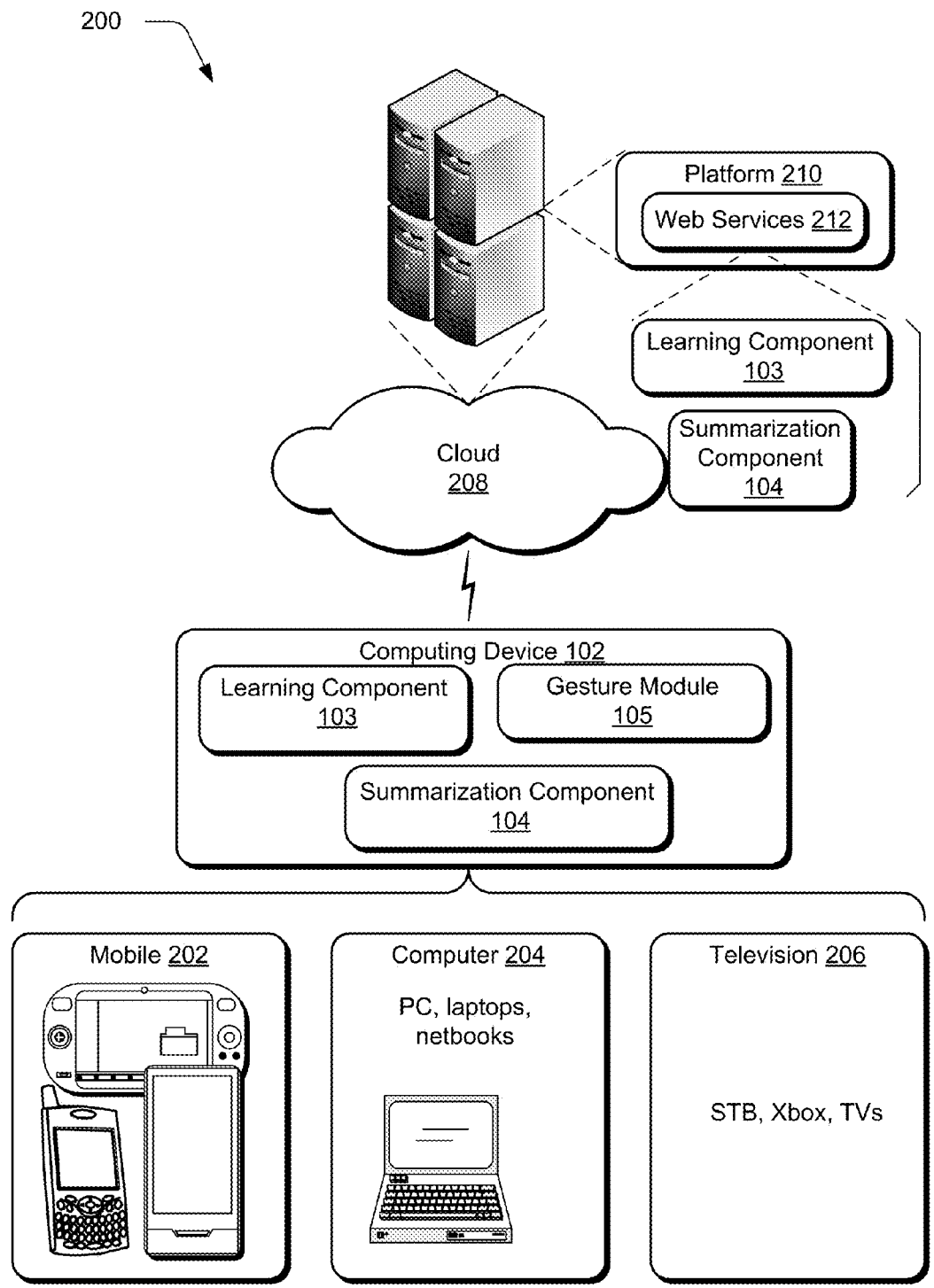
FIG. 2 is an illustration of a system in an example implementation showing FIG. 1 in greater detail.

FIG. 2 illustrates an example system 200 showing the learning component 103, summarization component 104, and gesture module 105 as being implemented in an environment where multiple devices are interconnected through a central computing device. While FIG. 2 illustrates the learning component 103 and summarization component 104 as residing on computing device 102, it is to be appreciated and understood that these components can also be distributed across other computing devices, such as on platform 210 as part of web services 212, as indicated by the dashed lines. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described the computing device 102 may be configured in a variety of different ways, such as for mobile 202, computer 204, and television 206 uses. Each of these configurations has a generally corresponding screen size and thus the computing device 102 may be configured as one of these device classes in this example system 200. For instance, the computing device 102 may assume the mobile 202 class of device which includes mobile telephones, music players, game devices, and so on. The computing device 102 may also assume a computer 204 class of device that includes personal computers, laptop computers, netbooks, and so on. The television 206 configuration includes configurations of device that involve display in a casual environment, e.g., televisions, set-top boxes, game consoles, and so on. Thus, the techniques described herein may be supported by these various configurations of the computing device 102 and are not limited to the specific examples described in the following sections.

Cloud 208 is illustrated as including a platform 210 for web services 212. The platform 210 abstracts underlying functionality of hardware (e.g., servers) and software resources of the cloud 208 and thus may act as a "cloud operating system." For example, the platform 210 may abstract resources to connect the computing device 102 with other computing devices. The platform 210 may also serve to abstract scaling of resources to provide a corresponding level of scale to encountered demand for the web services 212 that are implemented via the platform 210. A variety of other examples are also contemplated, such as load balancing of servers in a server farm, protection against malicious parties (e.g., spam, viruses, and other malware), and so on.

Thus, the cloud 208 is included as a part of the strategy that pertains to software and hardware resources that are made available to the computing device 102 via the Internet or other networks. For example, the learning component 103 and summarization component 104 may be implemented in part on the computing device 102 as well as via a platform 210 that supports web services 212.

The gesture techniques supported by the gesture module may be detected using touchscreen functionality in the mobile configuration 202, track pad functionality of the computer 204 configuration, detected by a camera as part of support of a natural user interface (NUI) that does not involve contact with a specific input device, and so on. Further, performance of the operations to detect and recognize the inputs to identify a particular gesture may be distributed throughout the system 200, such as by the computing device 102 and/or the web services 212 supported by the platform 210 of the cloud 208.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

In the discussion that follows, various sections describe various example embodiments. A section entitled "Example Learning Component" describes an example learning component in accordance with one or more embodiments. Next, a section entitled "Example Summarization Component" describes an example summarization component in accordance with one or more embodiments. Following this, a section entitled "Example Method" describes an example method in accordance with one or more embodiments. Last, a section entitled "Example Device" describes aspects of an example device that can be utilized to implement one or more embodiments.

Having described example operating environments in which the microblogs can be summarized, consider now a discussion of an example implementation in accordance with one or more embodiments.

Example Learning Component

Figure 3:
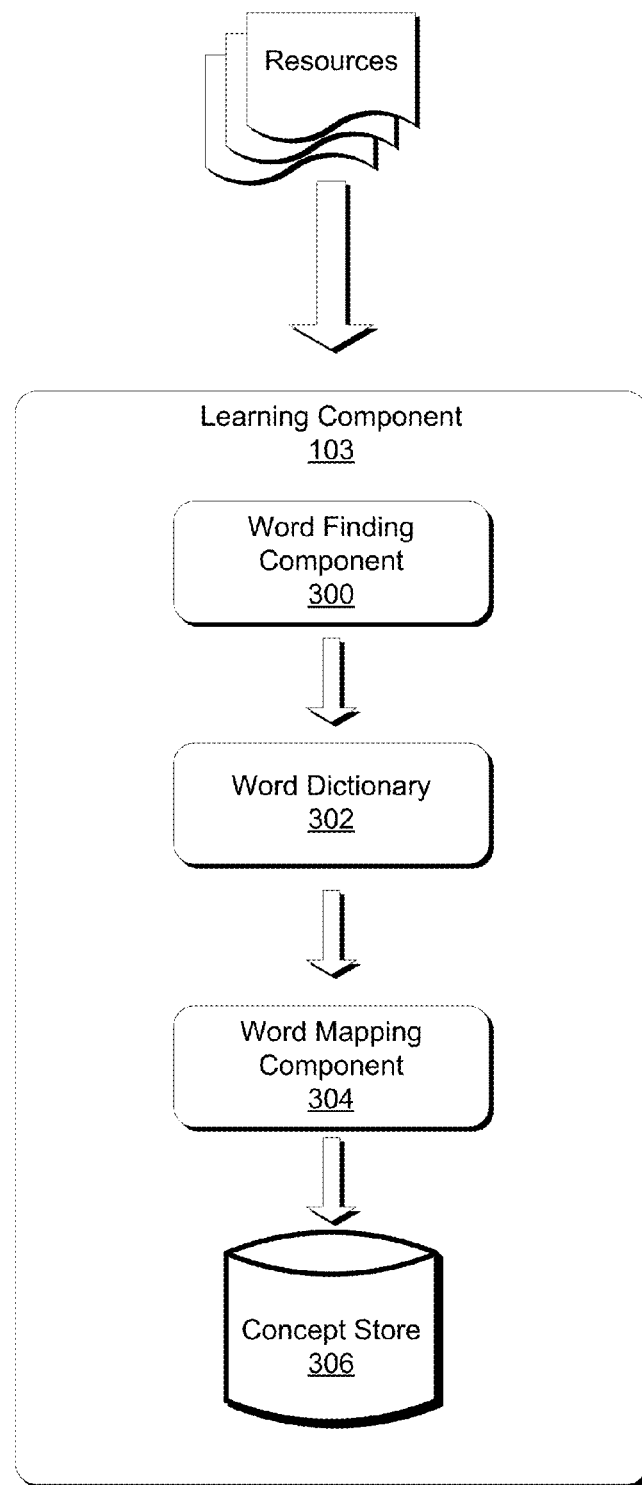
FIG. 3 illustrates an example learning component in accordance with one or more embodiments.

FIG. 3 illustrates an example learning component 103 in accordance with one or more embodiments. In this example, learning component 103 includes a word finding component 300, a word dictionary 302, a word mapping component 304, and a concept store 306.

Word finding component 300 is representative of functionality that processes multiple resources and computes a measure of how often individual words appear in conjunction with a company name. This can be performed in any suitable way, examples of which are provided below. These words are used to then build word dictionary 302. In one or more embodiments, word dictionary 302 contains nouns that are found to be commonly associated with companies.

Word dictionary 302 is representative of functionality that contains words, e.g. nouns, that are identified by the word finding component 300. The words appearing in word dictionary 302 are then processed by word mapping component 304.

Word mapping component 304 is representative of functionality that processes or maps the words appearing in word dictionary 302 to create broader concepts from these words. Any suitable techniques can be utilized to map the words appearing in word dictionary 300 to broader concepts, an example of which is provided below.

Concept store 306 is configured to store the various concepts that are defined for use in summarizing microblogs as described below.

In operation, and in connection with one specific implementation example, learning component 103 can operate as follows.

As noted above, multiple resources are processed by the word finding component 300 to create a word list that is represented by word dictionary 302. In the specific implementation example, the dictionary contains nouns that are commonly associated with companies. For example, a company typically has a CEO, executives, offices, staff, customers, and products. These nouns, as well as others, are learned automatically from a news corpus since companies are often discussed in the news.

In one example, an entire year's worth of the New York Times news articles were used for analysis. Each news article can correspond to a file. The files are automatically assigned parts of speech tags and marked with named entities, e.g., mentions of people, organization, and/or locations. The organization or company mentions that occur in the articles are tagged as "companies" and are replaced with a generic token "COMPANY". Next, a pre-defined window of words is utilized to select words both before and after all COMPANY mentions as candidates $w_i$ and an association measure is computed for each of them. Any suitably-sized pre-defined window can be utilized. In the present implementation example, a pre-defined window of 20 words was utilized. The association measure reflects how often a word appears in conjunction with a company name. Any suitable type of technique can be utilized to compute the association measure. In the illustrated and described embodiment, a technique known as mutual information can be used to measure co-occurrence. In the present example, the mutual information or association measure for a particular word can be computed as follows:

$$MI(w_i, COMPANY) = \log \frac{p(w_i, COMPANY)}{p(w_i)p(COMPANY)}$$

Here, $w_i$ and COMPANY are two discrete random variables; $p(w_i, COMPANY)$ is the joint probability distribution function of $w_i$ and COMPANY; and $p(w_i)$ and $p(COMPANY)$ are the marginal probability distribution functions of $w_i$ and COMPANY, respectively.

In this particular example, the top few thousand nouns in this ranking are taken and a company-dictionary, e.g. word dictionary 302, is compiled.

Figure 4:
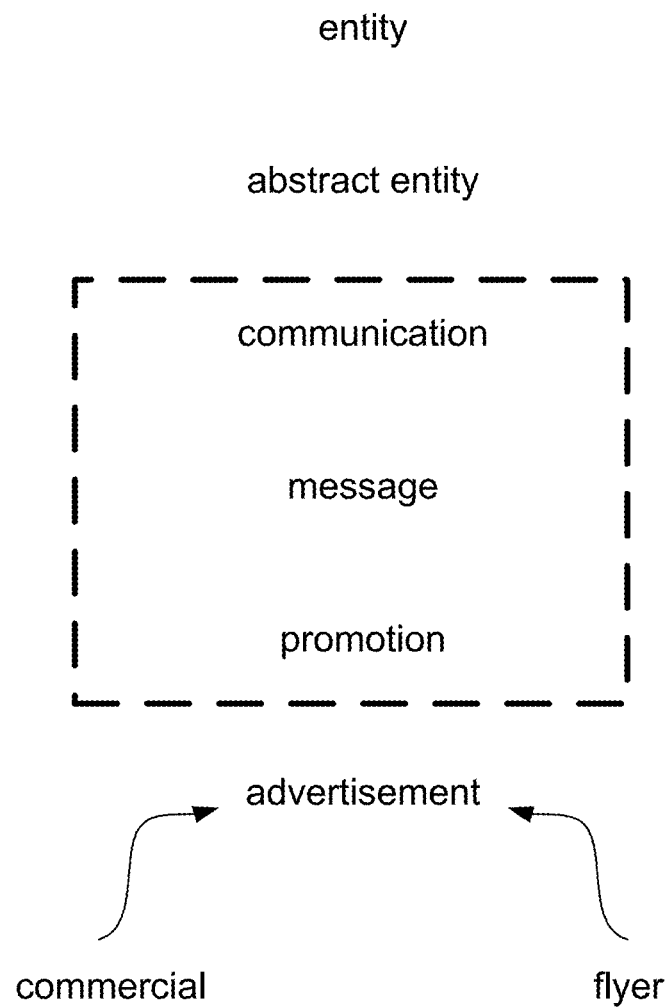
FIG. 4 illustrates an example hypernym tree in accordance with one or more embodiments.

Next, as noted above, broader concepts are created from the words appearing in the word dictionary 302. This is done using the word mapping component 304. In this particular specific example, the broader concepts are derived by utilizing a so-called hypernym path. Any suitable approach that utilizes hypernym paths can be used. In one specific example, WordNet, a lexical database for the English language in which words are organized in a hierarchy, was used. From WordNet, one can obtain the more general concepts of a word. For example, an "executive" is a "person" and a "dog" is an "animal". In the illustrated and described embodiment, the hypernym path of each company word in the word dictionary 302 is examined and words appearing at multiple different levels are recorded. In at least some embodiments, the more general words from upper levels of the hypernym path are recorded. As an example, consider FIG. 4.

There, two nouns "commercial" and "flyer" appear. These nouns are mapped to semantic tags that appear in multiple different hierarchical levels. In the illustrated example, these nouns map to the same selection of levels in the illustrated hypernym tree and, accordingly, get grouped under the "communication-message-promotion" semantic tag. Any suitable number of levels can be utilized without departing from the spirit and scope of the claimed subject matter. In this particular example, the semantic tags appearing at levels 3, 4 and 5 are utilized as indicated by the dashed rectangle. The semantic tags appearing at this collection of levels constitutes a more general concept than the original word. Yet, the more general concept is not too general. Since the tags are more general, multiple words get mapped to the same cluster, thus forming "concepts" which are then stored in concept store 306. Concepts are thus defined by a semantic tag and the words that get mapped to it.

Processing the nouns in word dictionary 302, as described above, results in a number of different concepts. These concepts can be fairly diverse and can be intuitively understood to be business-related. These concepts can then be renamed to give them more informative names. For example, examples of concepts include, by way of example and not limitation, "people", "events", "assets", "organization", "communication", and the like. Each concept in concept store 306 also includes the words which mapped to it. For example, the "people" concept contains words such as "executive", "CEO", "customer", and "analyst". The words that map to the concept are referred to as "prior words". In the illustrated and described embodiment, the above-described processing can be done off-line.

Having considered an example learning component and how a concept store can be built in accordance with one or more embodiments, consider now a discussion of an example summarization component that can perform summarization processing utilizing the concept store, in accordance with one or more embodiments.

Example Summarization Component

Figure 5:
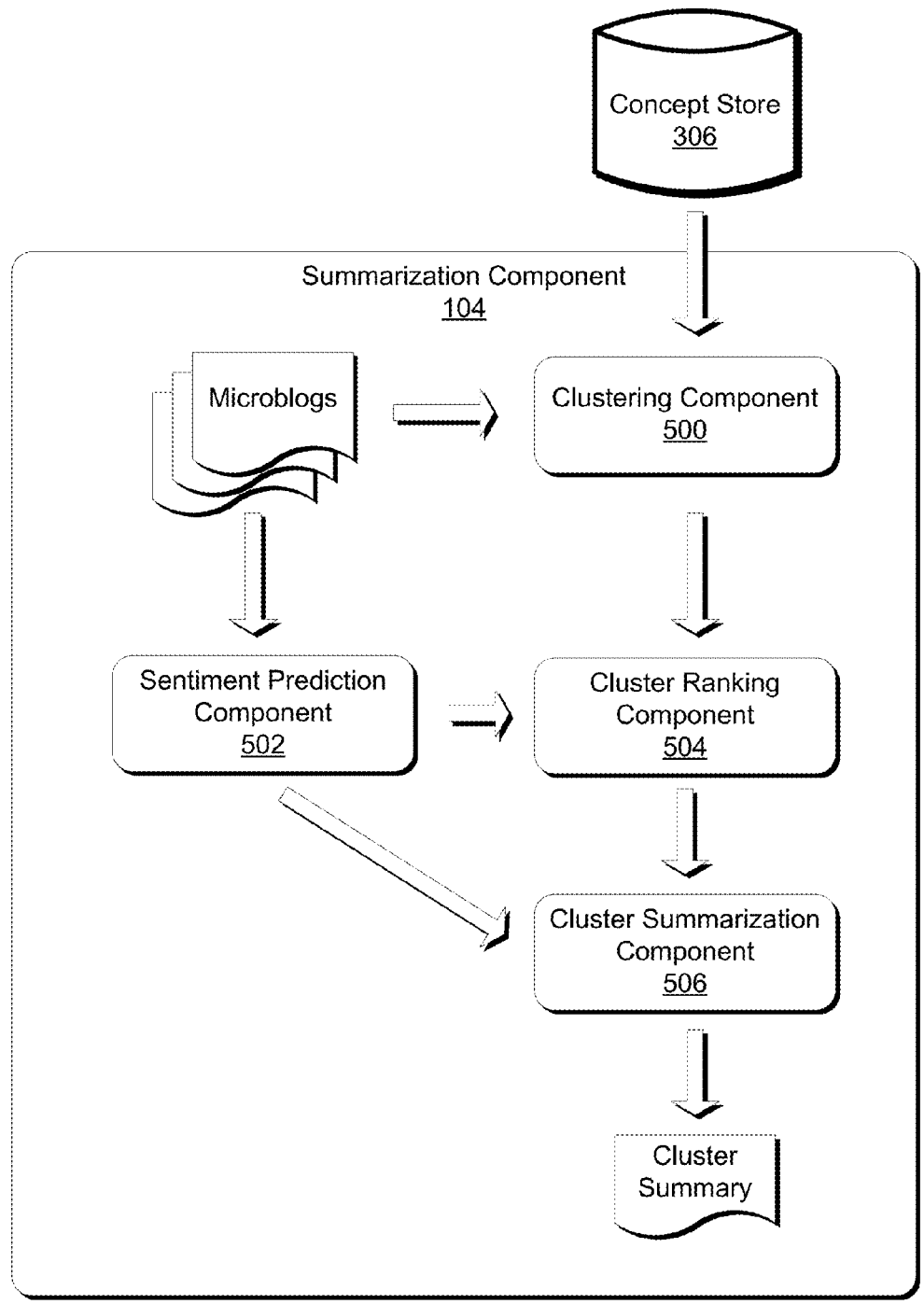
FIG. 5 illustrates an example summarization component in accordance with one or more embodiments.

FIG. 5 illustrates an example summarization component 104 in accordance with one or more embodiments. In this example, summarization component 104 includes a clustering component 500, a sentiment prediction component 502, a cluster ranking component 504, and a cluster summarization component 506.

Clustering component 500 is representative of functionality that forms individual clusters based on input from both the microblogs for a particular company and concepts from the concept store.

Sentiment prediction component 502 is representative of functionality that computes a sentiment value for individual microblogs. Sentiment values can be computed in any suitable way, an example of which is provided below.

Cluster ranking component 504 is representative of functionality that ranks the individual clusters from cluster component 500 using sentiment values as computed by sentiment prediction component 502. But one example of how this can be done is provided below.

Cluster summarization component 506 is representative of functionality that provides a concise cluster summary of each cluster. But one example of how this can be done is provided below.

In operation, summarization component 104 can operate as follows. Each concept from the concept store represents a possible cluster for the microblogs. For clustering the microblogs from one particular company, each microblog is assigned, by the clustering component 500, to one of the possible concepts from concept store 306. As a first step, a membership score is for the microblog with each of the concepts. Thus, if there are ten microblogs and ten concepts, a total of 100 membership scores are computed. A membership score can be computed in any suitable way. In the illustrated and described embodiment, the words appearing in the microblog are checked and those that are direct matches for any of the prior words of the cluster are recorded. These are referred to as "exact matches" for that cluster. An attempt is then made to map the remaining non-exact-matching words to the semantic tag of the cluster using, in this particular example, WordNet. That is, the remaining non-exact-matching words are abstracted using a hypernym path to ascertain whether any of the non-exact-matching words have the semantic tag of the cluster as a sub-string in their hypernym path. These words are referred to as "fuzzy matches". The membership score for the microblog-cluster pair is then computed as:

$$\text{score}(t_i, c_j) = \lambda \ast |\text{exact matches}| + (1-\lambda) \ast |\text{fuzzy matches}|$$

Here $\lambda$ is a value between 0 and 1 and gives higher weight to exact matches. Next, the microblog is assigned to the cluster for which it has the highest score, thereby assigning each microblog to only one cluster. The words from the microblog which had exact or fuzzy matches are stored as the "mapping words" for the corresponding assigned cluster. It is possible for a microblog to have the same membership score for more than one cluster. In these instances, any suitable heuristic can be utilized to handle ties and assign each microblog to a specific cluster such as, by way of example and not limitation, randomly assigning the microblog to one of the clusters, to the larger of the clusters currently formed, or to the smaller one.

Having formed the clusters with their associated microblogs and mapping words using the clustering component 500 as described above, the clusters can now be ranked by the cluster ranking component 504. Recall that the cluster ranking component 504 ranks the individual clusters using statistics about the mapping words and the sentiment value of the assigned microblogs as computed by sentiment prediction component 502. Specifically, the clusters are ranked, in this example, using an entropy measure on the mapping words of each cluster. If some mapping words have a very high probability in a cluster, then it indicates a widely discussed subtopic. On the other hand, if the mapping words vary widely with no clear majority, then it is a cluster of diverse subtopics and therefore less important. Further, mapping words with sentiment are given more weight in the calculation than those without sentiment. This can be performed in any suitable way. In the illustrated and described embodiment, this can be performed as follows.

Consider a cluster $C_j$ with some mapping words. The probability of a mapping word $w_i$ is given as:

$$p(w_i) = \frac{\#(w_i)}{\sum_j \#(w_j)}$$

where $\#(w_i)$, the count of a mapping word is computed as:

$$\#(w_i) = \sum_k \text{SentimentValue}(S_k) \text{ where } S_k \text{ is a microblog mapped to } C_j \text{ by } w_i$$

Any suitable type of sentiment analysis can be utilized to compute sentiment values. In general, sentiment analysis is directed to ascertaining the attitude of a speaker or a writer with respect to some topic or the overall contextual polarity of a document, such as a microblog or tweet. The particular attitude may be his or her judgment, evaluation, or opinion.

In the illustrated and described embodiment, the sentiment value of a microblog ranges between 0 and 1 and is computed from the predictions of a sentiment classifier on the given microblog. The classifier does a three-way classification of microblogs into positive, negative and neutral categories.

The classifier also outputs a probability distribution over these three classes for the likelihood of a microblog belonging to each of the classifications. The sentiment value is computed as the absolute difference in positive and negative confidence value from the classifier. The value is equal to "1", if the microblog is either positive or negative, and the value is equal to "0" when the microblog is completely neutral. In other cases, the score is indicative of the degree of subjectivity in the sentence.

Using these probabilities the entropy value of $C_j$ is computed as follows:

$$E(C_j) = -\sum_i p(w_i) \log p(w_i) \text{ where } w_i \text{ is a mapping word for } C_j$$

Lower values of entropy indicate a more skewed distribution of mapping words and therefore a better cluster. But, because larger sized clusters are more biased towards higher entropy, a weighting factor is applied to reduce the entropy of large clusters. The weighting factor is computed as follows:

$$Eadjusted(C_j) = \left(1 - \frac{|C_j|}{\sum_k |C_k|}\right) E(C_j)$$

This score Eadjusted is the final score for a particular cluster. Lower values of this measure indicate higher ranked clusters. This score combines both sentiment and homogeneity information since the probability of words is computed using the sentiment scores. However, when the entropy is zero, information about sentiment value is lost. Accordingly, in these instances, the average sentiment value on the mapping word is checked and, if below a threshold, the cluster is demoted and assigned the largest entropy value across all clusters.

Having ranked the clusters as described above, the clusters can now be summarized by cluster summarization component 506 as follows.

In the illustrated and described embodiment, a headline is first generated for the cluster. This headline is the sorted list of mapping words according to the probability as computed above. The top headline words are then shown for each cluster.

Then some example microblogs are selected for the cluster. Selection is biased towards the microblogs containing the headline words, so the combination of seeing a headline word and associated microblog is more useful for a user. Just as in ranking, both frequency and sentiment information are combined for summarization. For example, after the sentences matching a headline word are obtained, they are ranked using the probability of words contained in the microblog and the sentiment value attached to the sentences. In this way, both frequency and sentiment value are used for summarization. In one or more embodiments, the top two headline words are used for summary creation.

For each of the two headline words, all of the microblogs associated with the headline words are selected. Then, a summary is created for the set of microblogs by ranking the microblogs in the set. The ranking score is the average probability of words in the microblog, where probability is computed in a similar manner as described above. For the first headline word, two sentences are selected and, for the second headline word, one sentence is selected. A total of three sentences per cluster are obtained in this way. For the final interface, the clusters are shown in order up to a certain limit on the number of microblogs displayed.

Having considered an example learning component and summarization component in accordance with one or more embodiments, consider now a discussion of an example method in accordance with one or more embodiments.

Example Method

Figure 6:
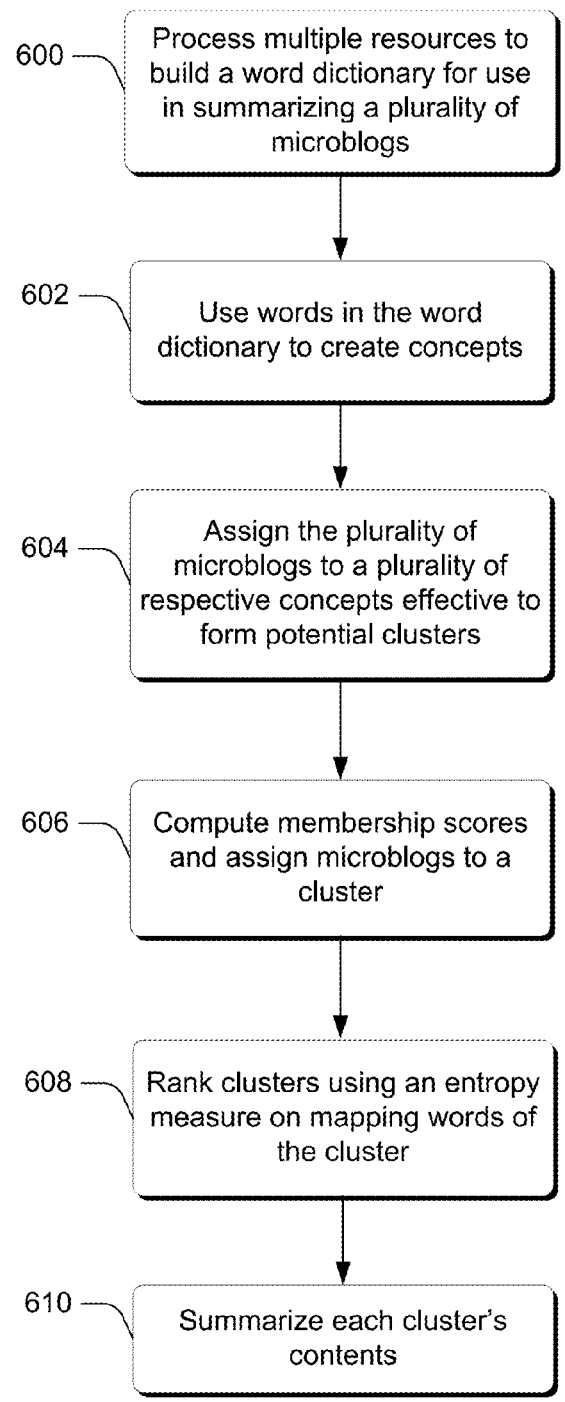
FIG. 6 is a flow diagram that describes steps in a method in accordance with one or more embodiments.

FIG. 6 is a flow diagram that describes steps in a method in accordance with one or more embodiments. The method can be performed in connection with any suitable hardware, software, firmware, or combination thereof. In at least some embodiments, the method can be performed by software embodied on some type of computer-readable storage medium. But one example of software that can perform the functionality about to be described combines the learning component 103 and the summarization component 105, described above.

Step 600 processes multiple resources to build a word dictionary for use in summarizing a plurality of microblogs. Any suitable resources can be utilized. For example, in the embodiment described above, news articles were utilized to build the word dictionary. This process can be an automatic process that employs co-occurrence techniques to build the word dictionary. One example of a co-occurrences technique is described above.

Step 602 uses words in the word dictionary to create concepts. Any suitable technique can be utilized to create concepts. Concepts represent broader notions of a particular word. In the illustrated and described embodiment, these more general concepts lie along a hypernym path that has multiple different hierarchical levels. Words appearing at a subset of the multiple different hierarchical levels are utilized to form a "semantic tag."

Step 604 assigns a plurality of microblogs to the plurality of respective concepts effective to form multiple clusters. In this particular example, each microblog gets assigned to each concept effective to form potential clusters, as described above. Step 606 then computes a membership score for each microblog/cluster pairing and assigns a microblog to a cluster for which its membership score is highest. Thus, each microblog ends up in exactly one cluster. An example of how this can be done is provided above.

Step 608 then ranks the clusters using an entropy measure on mapping words of the cluster. In the illustrated and described embodiment, the mapping process incorporates a sentiment value by assigning mapping words with sentiment a higher weight than mapping words without sentiment.

Next, step 610 summarizes each cluster's contents. In at least some embodiments, summarization can take place by selecting one or more sentences based on a probability measure of the words in the sentence combined with sentiment degree. The probability can be calculated as described above. Once a cluster's contents have been summarized, the summary sentence or sentences for a microblog can be displayed to inform a user as to the content of a particular microblog or tweet.

Having described example embodiments, consider now a discussion of an example device that can be utilized to implement the embodiments described above.

Example Device

Figure 7:
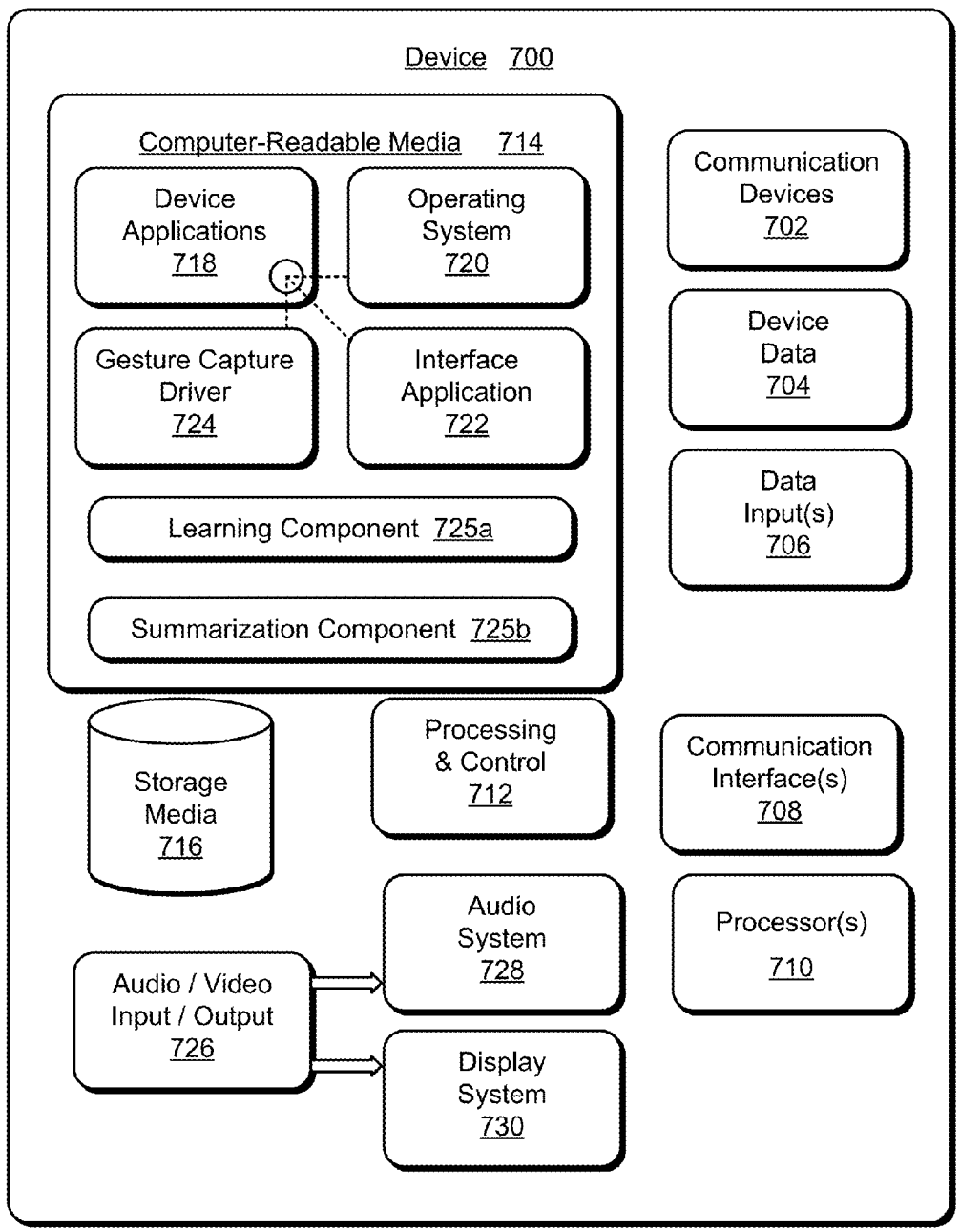
FIG. 7 illustrates an example computing device that can be utilized to implement various embodiments described herein.

FIG. 7 illustrates various components of an example device 700 that can be implemented as any type of portable and/or computer device as described with reference to FIGS. 1 and 2 to implement embodiments described herein. Device 700 includes communication devices 702 that enable wired and/or wireless communication of device data 904 (e.g., received data, data that is being received, data scheduled for broadcast, data packets of the data, etc.). The device data 704 or other device content can include configuration settings of the device, media content stored on the device, and/or information associated with a user of the device. Media content stored on device 700 can include any type of audio, video, and/or image data. Device 700 includes one or more data inputs 706 via which any type of data, media content, and/or inputs can be received, such as user-selectable inputs, messages, music, television media content, recorded video content, and any other type of audio, video, and/or image data received from any content and/or data source.

Device 700 also includes communication interfaces 708 that can be implemented as any one or more of a serial and/or parallel interface, a wireless interface, any type of network interface, a modem, and as any other type of communication interface. The communication interfaces 708 provide a connection and/or communication links between device 700 and a communication network by which other electronic, computing, and communication devices communicate data with device 700.

Device 700 includes one or more processors 710 (e.g., any of microprocessors, controllers, and the like) which process various computer-executable or readable instructions to control the operation of device 700 and to implement the embodiments described above. Alternatively or in addition, device 700 can be implemented with any one or combination of hardware, firmware, or fixed logic circuitry that is implemented in connection with processing and control circuits which are generally identified at 712. Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 700 also includes computer-readable media 714, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 700 can also include a mass storage media device 716.

Computer-readable media 714 provides data storage mechanisms to store the device data 704, as well as various device applications 718 and any other types of information and/or data related to operational aspects of device 700. For example, an operating system 720 can be maintained as a computer application with the computer-readable media 714 and executed on processors 710. The device applications 718 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 718 also include any system components or modules to implement embodiments of the techniques described herein. In this example, the device applications 718 include an interface application 722 and a gesture-capture driver 724 that are shown as software modules and/or computer applications. The gesture-capture driver 724 is representative of software that is used to provide an interface with a device configured to capture a gesture, such as a touchscreen, track pad, camera, and so on. Alternatively or in addition, the interface application 722 and the gesture-capture driver 724 can be implemented as hardware, software, firmware, or any combination thereof. In addition, computer readable media 714 can include a learning component 725*a* and a summarization component 725*b* that functions as described above.

Device 700 also includes an audio and/or video input-output system 726 that provides audio data to an audio system 728 and/or provides video data to a display system 730. The audio system 728 and/or the display system 730 can include any devices that process, display, and/or otherwise render audio, video, and image data. Video signals and audio signals can be communicated from device 700 to an audio device and/or to a display device via an RF (radio frequency) link, S-video link, composite video link, component video link, DVI (digital video interface), analog audio connection, or other similar communication link. In an embodiment, the audio system 728 and/or the display system 730 are implemented as external components to device 700. Alternatively, the audio system 728 and/or the display system 730 are implemented as integrated components of example device 700.

Conclusion

Various embodiments provide summarization techniques that can be applied to blogs or microblogs to present information that is determined to be useful, in a shortened form. In one or more embodiments, a procedure is utilized to automatically acquire a set of concepts from various sources, such as free text. These acquired concepts are then used to guide a clustering process. Clusters are ranked and then summarized by incorporating sentiment and the frequency of words.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A method comprising:
processing, using a computing device, multiple resources to build a word dictionary configured to enable summarizing a plurality of microblogs, the word dictionary containing individual words that are nouns that are associated with a particular domain;
using, using the computing device, the word dictionary to create concepts, at least some individual concepts comprising a semantic tag comprising multiple words;
assigning, using the computing device, a plurality of microblogs to a plurality of the concepts effective to form potential clusters;
computing, using the computing device, a membership score for each microblog/cluster pairing;
using, using the computing device, the membership score to assign a microblog to a cluster;
ranking, using the computing device, each cluster using an entropy measure that incorporates sentiment value computed for each microblog and probability of words computed over microblogs in a particular cluster, and
summarizing the plurality of microblogs by displaying a cluster summary for each cluster on a display of the computing device.

2. The method of claim 1, wherein said processing multiple resources comprises using, using the computing device, a co-occurrence technique to build the word dictionary.

3. The method of claim 1, wherein said microblogs comprise company-related microblogs.

4. The method of claim 1, wherein processing the multiple resources to build a word dictionary comprises:
building, using the computing device, a word dictionary that contains nouns associated with companies;

using, using the computing device, a pre-defined window of words to select words before and after mentions associated with a company; and computing, using the computing device, an association measure for at least some individual words, the association measure reflecting how often the word appears in conjunction with a company mention.

5. The method of claim 1, wherein using the word dictionary to create concepts comprises utilizing, using the computing device, a hypernym path.

6. The method of claim 1, wherein using the word dictionary to create concepts comprises utilizing, using the computing device, a hypernym path, the semantic tag comprising multiple words from the hypernym path.

7. The method of claim 1, wherein using the word dictionary to create concepts comprises utilizing, using the computing device, a hypernym path, the semantic tag comprising multiple words from the hypernym path, the multiple words appearing at different hierarchical levels of the hypernym path.

8. A device comprising:
one or more processors;
one or more computer-readable storage media comprising computer readable instructions which, when executed by the one or more processors, perform operations comprising:
ranking individual clusters using an entropy measure on mapping words associated with the cluster, the entropy measure incorporating sentiment values associated with the mapping words, the clusters being associated with microblogs that are to be summarized, the mapping words being mapped from words appearing in a word dictionary, the word dictionary being comprised of individual words processed from multiple resources;
summarizing each cluster's content; and
displaying the summary on a display of the device.

9. The device of claim 8, wherein said summarizing comprises selecting one or more sentences based on a probability measure that incorporates a degree of sentiment relative to words that appear in the one or more sentences.

10. The device of claim 8, wherein the microblogs are associated with one or more companies.

11. The device of claim 8, wherein the ranking comprises computing probabilities of mapping words, wherein a mapping word's probability incorporates an associated sentiment value.

12. The device of claim 8, wherein the ranking comprises computing probabilities of mapping words, wherein a mapping word's probability incorporates an associated sentiment value, sentiment values being associated with classifications of a microblog into positive, negative, or neutral categories.

13. The device of claim 8, wherein the ranking comprises:
computing probabilities of mapping words, wherein a mapping word's probability incorporates an associated sentiment value; and
computing entropy measures that take into account probabilities associated with the cluster's mapping words.

14. The device of claim 8, wherein the ranking comprises:
computing probabilities of mapping words, wherein a mapping word's probability incorporates an associated sentiment value; and
computing entropy measures that take into account probabilities associated with the cluster's mapping words; and further comprising weighting computed entropy measures to reduce the entropy of at least some clusters.

15. The device of claim 8, wherein said summarizing comprises generating a headline for a cluster, wherein the headline comprises a sorted list of mapping words that define headline words.

16. The device of claim 8, wherein said summarizing comprises generating a headline for a cluster, wherein the headline comprises a sorted list of mapping words that define headline words; and
further comprising selecting microblogs for the cluster biased toward microblogs containing the headline words.

17. The device of claim 8, wherein the individual microblogs have 1000 or less characters.

18. The device of claim 8, wherein the individual microblogs have 140 characters or less.

19. A system comprising:
one or more processors;
one or more computer readable storage media storing computer instructions that execute on the one or more processors;
a learning component stored on the one or more computer readable storage media comprising:
a word finding component configured to process multiple resources and compute a measure of how often individual words appear in conjunction with a company name;
a word dictionary configured to contain the individual words that are nouns that are identified by the word finding component;
a word mapping component configured to map words appearing in the word dictionary, using a hierarchical hypernym path, to create concepts;
a concept store configured to store concepts that are created by the word mapping component, the concepts being configured to enable summarization of microblogs having 1000 characters or less; and
a summarization component stored on the one or more computer readable storage media comprising:
a clustering component configured to form individual clusters based on input from a plurality of microblogs for a particular company and concepts from the concept store;
a sentiment prediction component configured to compute a sentiment value for individual microblogs;
a cluster ranking component configured to rank individual clusters from the clustering component using sentiment values computed by the sentiment prediction component and probability of words computed over microblogs in a particular cluster;
a cluster summarization component configured to provide a summary of individual clusters; and
a display component configured to display the summary.

20. The system of claim 19, wherein the cluster summarization component is further configured to:
generate a headline for a cluster, wherein the headline comprises a sorted list of mapping words that define headline words; and
select microblogs for the cluster biased toward microblogs containing the headline words.

* * * * *